US007660715B1

(12) United States Patent
Thambiratnam (10) Patent No.: US 7,660,715 B1
(45) Date of Patent: Feb. 9, 2010

(54) TRANSPARENT MONITORING AND INTERVENTION TO IMPROVE AUTOMATIC ADAPTATION OF SPEECH MODELS (75) Inventor: David Preshan Thambiratnam, Ashfield (AU)

(73) Assignee: Avaya Inc., Basking Ridge, NJ (US)

( * ) Notice: Subject to any disclaimer, the term of this patent is extended or adjusted under 35 U.S.C. 154(b) by 1293 days.

(21) Appl. No.: 10/756,669

(22) Filed: Jan. 12, 2004

(51) Int. Cl.
G10L 15/06 (2006.01)
(52) U.S. Cl. ...................................... 704/244
(58) Field of Classification Search .......... 704/244–247
See application file for complete search history.

(56) References Cited

U.S. PATENT DOCUMENTS

| 4,468,804 | A |   | 8/1984  | Kates et al.          |
|-----------|---|---|---------|-----------------------|
| 4,696,039 | A |   | 9/1987  | Doddington            |
| 4,852,170 | A |   | 7/1989  | Bordeaux              |
| 5,018,200 | A |   | 5/1991  | Ozawa                 |
| 5,206,903 | A |   | 4/1993  | Kohler et al.         |
| 5,583,969 | A |   | 12/1996 | Yoshizumi et al.      |
| 5,634,086 | A | * | 5/1997  | Rtischev et al. ............. 704/270 |
| 5,644,680 | A | * | 7/1997  | Bielby et al. ................. 704/240 |
| 5,684,872 | A |   | 11/1997 | Flockhart et al.      |
| 5,802,149 | A | * | 9/1998  | Hanson .................... 379/88.03 |
| 5,828,747 | A |   | 10/1998 | Fisher et al.         |
| 5,905,793 | A |   | 5/1999  | Flockhart et al.      |
| 5,982,873 | A |   | 11/1999 | Flockhart et al.      |
| 6,064,731 | A |   | 5/2000  | Flockhart et al.      |
| 6,084,954 | A |   | 7/2000  | Harless et al.        |
| 6,088,441 | A |   | 7/2000  | Flockhart et al.      |
| 6,122,614 | A | * | 9/2000  | Kahn et al. .................. 704/235 |

(Continued)

FOREIGN PATENT DOCUMENTS

| CA | 1333425 | 12/1994 |
|----|---------|---------|
| EP | 0076687 | 4/1983  |
| EP | 0140249 | 5/1985  |

(Continued)

OTHER PUBLICATIONS

U.S. Appl. No. 11/131,108, filed May 16, 2005, Michaelis.

(Continued)

Primary Examiner—Michael N Opsasnick
(74) Attorney, Agent, or Firm—Sheridan Ross P.C.

(57) ABSTRACT

A system and method to improve the automatic adaptation of one or more speech models in automatic speech recognition systems. After a dialog begins, for example, the dialog asks the customer to provide spoken input and it is recorded. If the speech recognizer determines it may not have correctly transcribed the verbal response, i.e., voice input, the invention uses monitoring and if necessary, intervention to guarantee that the next transcription of the verbal response is correct. The dialog asks the customer to repeat his verbal response, which is recorded and a transcription of the input is sent to a human monitor, i.e., agent or operator. If the transcription of the spoken input is correct, the human does not intervene and the transcription remains unmodified. If the transcription of the verbal response is incorrect, the human intervenes and the transcription of the misrecognized word is corrected. In both cases, the dialog asks the customer to confirm the unmodified and corrected transcription. If the customer confirms the unmodified or newly corrected transcription, the dialog continues and the customer does not hang up in frustration because most times only one misrecognition occurred. Finally, the invention uses the first and second customer recording of the misrecognized word or utterance along with the corrected or unmodified transcription to automatically adapt one or more speech models, which improves the performance of the speech recognition system.

24 Claims, 2 Drawing Sheets

U.S. PATENT DOCUMENTS

| | | | |
|---|---|---|---|
| 6,151,571 | A | 11/2000 | Pertrushin |
| 6,163,607 | A | 12/2000 | Bogart et al. |
| 6,173,053 | B1 | 1/2001 | Bogart et al. |
| 6,178,400 | B1 | 1/2001 | Eslambolchi |
| 6,192,122 | B1 | 2/2001 | Flockhart et al. |
| 6,243,680 | B1 * | 6/2001 | Gupta et al. ............... 704/260 |
| 6,259,969 | B1 | 7/2001 | Tackett et al. |
| 6,275,806 | B1 | 8/2001 | Pertrushin |
| 6,275,991 | B1 | 8/2001 | Erlin |
| 6,278,777 | B1 | 8/2001 | Morley et al. |
| 6,292,550 | B1 | 9/2001 | Burritt |
| 6,314,165 | B1 * | 11/2001 | Junqua et al. ............ 379/88.03 |
| 6,353,810 | B1 | 3/2002 | Petrushin |
| 6,363,346 | B1 | 3/2002 | Walters |
| 6,374,221 | B1 * | 4/2002 | Haimi-Cohen ........... 704/256.1 |
| 6,389,132 | B1 | 5/2002 | Price |
| 6,408,273 | B1 | 6/2002 | Quagliaro et al. |
| 6,427,137 | B2 | 7/2002 | Petrushin |
| 6,463,415 | B2 | 10/2002 | St. John |
| 6,480,826 | B2 | 11/2002 | Pertrushin |
| 6,697,457 | B2 | 2/2004 | Petrushin |
| 6,766,014 | B2 | 7/2004 | Flockhart et al. |
| 6,801,888 | B2 | 10/2004 | Hejna, Jr. |
| 6,823,312 | B2 | 11/2004 | Mittal et al. |
| 6,839,669 | B1 * | 1/2005 | Gould et al. ................ 704/246 |
| 6,847,714 | B2 | 1/2005 | Das et al. |
| 6,889,186 | B1 | 5/2005 | Michaelis |
| 6,940,951 | B2 * | 9/2005 | Mahoney ................. 379/88.03 |
| 6,999,563 | B1 * | 2/2006 | Thorpe et al. .............. 379/67.1 |
| 7,065,485 | B1 | 6/2006 | Chong-White et al. |
| 7,180,997 | B2 | 2/2007 | Knappe |
| 7,222,074 | B2 | 5/2007 | Zhou |
| 7,222,075 | B2 | 5/2007 | Petrushin |
| 7,267,652 | B2 | 9/2007 | Coyle et al. |
| 2002/0019737 | A1 * | 2/2002 | Stuart et al. ................. 704/275 |
| 2003/0191639 | A1 * | 10/2003 | Mazza ....................... 704/231 |
| 2004/0148161 | A1 | 7/2004 | Das et al. |
| 2004/0215453 | A1 | 10/2004 | Orbach |
| 2005/0065789 | A1 | 3/2005 | Yacoub et al. |
| 2005/0094822 | A1 | 5/2005 | Swartz |
| 2006/0036437 | A1 | 2/2006 | Bushey et al. |
| 2006/0252376 | A1 | 11/2006 | Fok |
| 2007/0038455 | A1 | 2/2007 | Murzina |

FOREIGN PATENT DOCUMENTS

| | | |
|---|---|---|
| EP | 0360265 | 3/1990 |
| JP | 10-124089 | 5/1998 |
| WO | WO 00/22611 | 4/2000 |
| WO | WO 2004/056086 | 7/2004 |

OTHER PUBLICATIONS

U.S. Appl. No. 11/508,442, filed Aug. 22, 2006, Coughlan.

U.S. Appl. No. 11/508,477, filed Aug. 22, 2006, Michaelis.

U.S. Appl. No. 11/768,567, filed Jun. 26, 2007, Coughlan.

U.S. Appl. No. 11/388,694, filed Mar. 24, 2006, Blair et al.

U.S. Appl. No. 10/882,975, filed Jun. 30, 2004, Becker et al.

Arslan, Levent M., "Foreign Accent Classification in American English," thesis, pp. 1-200, Department of Electrical Computer Engineering, Duke University, 1996.

Arslan, Levent M., et al., "Language Accent Classification in American English," Robust Speech Processing Laboratory Department of Electrical Engineering, Durham, North Carolina, Technical Report RSPL-96-7(1996).

Hansen, John H.L., et al., "Foreign Accent Classification Using Source Generator Based Prosodic Features," IEEE Proc. ICASSP, vol. 1, Detroit U.S.A., (1995), pp. 836-839.

Hosom, John-Paul, et al., "Training Neural Networks for Speech Recognition," Center for Spoken Language Understanding, Oregon Graduate Institute of Science and Technology (Feb. 2, 1999), 51 pages.

Jackson, Philip J.B., et al., "Aero-Acoustic Modeling of Voiced and Unvoiced Fricatives Based on MRI Data," University of Birmingham and University of Southampton, (undated), 4 pages.

Kirriemuri, John, "Speech Recognition Technologies," TSW 03-03 (Mar. 2003), 13 pages.

Lamel, L.F., et al., "Language Identification Using Phone-based Acoustic Likelihoods," ICASSP-94.

Loizou, Philip, "Speech Production and Perception," EE 6362 Lecture Notes (Fall 2000), pp. 1-30.

Michaelis, "Speech Digitization and Compression", In W. Warkowski (Ed.), International Encyclopedia of Ergonomics and Human Factors. London: Taylor Francis, 2001, 683-686.

Pervasive, Human-Centered Computing, MIT Project Oxygen, MIT Laboratory for Computer Science, Jun. 2000.

Zue, Victor, "The MIT Oxygen Project," MIT Laboratory for Computer Science, Apr. 25-26, 2000.

Novak, D Cuesta-Frau, and L. Lhotska: Speech recognition methods applied to biomedical signals processing. Engineering in Medicine and Biology Society. 2004; 1: 118-121.

Entwistle, The performance of automated speech recognition systems under adverse conditions of human exertion. Int. J. Hum.-Comput. Interact. 16 (2003) (2), pp. 127-140.

Entwistle, "Training Methods and Enrollment Techniques to Improve the Performance of Automated Speech Recognition Systems Under Conditions of Human Exertion", A Dissertation Submitted in Partial Fulfillment of The Requirements for the Degree of Doctor of Philosophy, University of South Dakota, Jul. 2005.

Landauer et al., "An Introduction to Latent Semantic Analysis", Discourse Processes, 1998, 41 pages.

Lin et al., "Phoneme-less Hierarchical Accent Classification", HP Laboratories Palo Alto, Oct. 4, 2004, 5 pages.

Background of The Invention for the above-captioned application (previously provided).

* cited by examiner

TRANSPARENT MONITORING AND INTERVENTION TO IMPROVE AUTOMATIC ADAPTATION OF SPEECH MODELS

FIELD OF THE INVENTION

The present invention is directed generally to a speech recognition system and specifically to a two-stage system to further filter information before adapting one or more speech models.

BACKGROUND OF THE INVENTION

A typical speech recognition system uses one or more speech models developed from a large vocabulary stored in a speech recognition adaptation database. The vocabulary includes most common words and attempts to cover vast language differences within a single language due to voice characteristics, dialects, education, noisy environments, etc. When the speech recognition system is first installed, often the performance is very poor because the one or more speech models need to be trained for the speakers in the region. Over a long period of time, retraining the speech models will improve the speech recognition system performance. Even after training the speech models, the speech recognition system typically recognizes an average speaker's verbal response. However, the speech recognizer may not still be able to correctly transcribe the verbal response of all speakers due to the reasons listed previously. Additionally, technical terms and proper names that have not entered the common jargon may not be recognized. Hence while undergoing this retraining process, which could take a significant period of time, the customer will continue to receive poor performance.

Typical speech recognition systems use unsupervised automatic adaptation, i.e., mathematical algorithms and/or confidence scores to determine whether to use a correctly or incorrectly recognized word or utterance and its transcript to update the vocabulary in the adaptation database. Mathematical algorithms determine the probability the transcription, i.e., text of the utterance or word is correct or incorrect. A high probability, such as 90%, would indicate the correct speech model was used to recognize the utterance or word. When the probability is high, it is likely the recognized utterance or word and transcript may be used to retrain one or more speech models.

The speech recognition system may assign a confidence score to each recognized utterance or word to provide a measure of the accuracy of the recognition for the utterance or word. Hence a confidence score of 30 or below would indicate the speech recognition system does not have much confidence the utterance or word was correctly recognized and should not be used to retrain one or more speech models. Whereas, a confidence score of 90 or above would indicate the utterance or word was correctly recognized and can be used to retrain one or more speech models.

One of the problems faced by current speech recognition systems using unsupervised automatic adaptation is the speech recognizer has no way of determining if it correctly recognized the word or utterance it will use to retrain one or more speech models. For example, if the confidence score or probability of correctness is low, the utterance or word is not used to adapt a speech model even if it was recognized correctly. However, if the confidence score or probability is high, but the utterance or word was incorrectly recognized, it will be used to adapt one or more speech models. Unfortunately when using incorrectly recognized utterances or words to adapt one or more speech models, instead of improved speech recognition, there is a decrease of correctly recognized utterances or words by the speech recognition system.

In this unsupervised mode, a dialog needs to request from the speaker a confirmation that it correctly recognized the verbal response, i.e., utterance or word, such as "Did you mean X?" Where X is the recognized verbal response, i.e., transcription or text of the utterance or word, that has been converted to speech by a text-to-speech resource. Typically confirmation is requested for complicated dialogs, such as when a customer requests to transfer money between bank accounts and the dialog requests confirmation of the bank account numbers and the amount of the transfer. Asking for confirmation after every verbal response by the customer can be annoying to the customer and lengthen the amount of time the customer is using the speech recognition system.

Additionally while the speech recognition system is undergoing the improvement process using unsupervised automatic adaptation of one or more speech models, the speaker will experience frustration and hang-up if the speech recognition system misrecognizes too many words or utterances.

The following is an example of a speech recognition system where multiple misrecognitions have occurred and the customer hangs up in frustration:

IVR dialog: "Please state the name of the company you wish to find."
Speaker: "Avaya."
IVR dialog: "Was that Papaya Limited?"
Speaker: "No."
IVR dialog: "Please state the name of the company you wish to find."
Speaker: "Avaya." (spoken in a louder tone)
IVR dialog: "Was that Avalon Labs?"
Speaker: "No."
IVR dialog: "Please state the name of the company you wish to find."
Speaker: "Avaya." (spoken in an frustrated voice)
IVR dialog: "Was that Papaya Limited?"
Speaker hangs up.

Another mode, such as supervised monitoring and intervention provides better input data to adapt one or more speech models. However, supervised monitoring and intervention has not been real-time, that is, monitoring a speaker's voice inputs has not been used to automatically adapt one or more speech models.

SUMMARY

These and other needs are addressed by the various embodiments of the present invention. The present invention is directed to the use of human operator-intervention in an automated speech recognition system to correct speech recognition errors.

In one embodiment of the present invention, an automatic speech recognition system (ASR) is provided that includes:

(a) a speech recognition resource operable to extract a first user utterance from a first input voice stream from a user, the first user utterance being in response to a query; select a first speech model as a first tentative recognition result characterizing the first user utterance; and determine that the first tentative recognition result does not correctly characterize the first user utterance; and (b) a model adaptation agent operable, when the first tentative recognition result does not correctly characterize the first user utterance, to alert a human operator, based on the first user utterance, to select a second speech model correctly characterizing the first user utterance.

The improved system and method can provide a real-time, hybrid mode to filter out incorrectly recognized data and quickly retrain and improve one or more speech models using only correctly recognized words or utterances. Thus, accuracy of the speech recognition system can increase dramatically, even during retraining of the ASR system, and provide increased levels of user/customer satisfaction. Providing accurate information to the adaptation engine can result in the ASR performance accuracy improving more rapidly when compared to conventional systems that do not employ human operator intervention as a filter. Although conventional systems that employ confidence measures can significantly increase the quality of data provided to the adaptation engine, this method possesses greater risk than that of the present invention as the use of confidence can lead to false positives and false negatives, leading to an overall rate of accuracy improvement that is less than that realized by the present invention. The present invention allows the ASR system to guarantee no more than one misrecognition, thereby avoiding false positives and negatives.

In one configuration, the ASR process of the present invention uses a two-stage process to filter effectively incorrectly recognized data.

In the first stage, mathematical algorithms and/or confidence scores are used by an automatic speech recognition system (ASR) to recognize utterances and words. The ASR enters a second stage when it believes that a word or utterance is incorrectly recognized. In this second stage, a human operator determines whether the ASR correctly or incorrectly recognized an utterance or word. If the ASR incorrectly recognized the word or utterance, the human operator intervenes to correct the transcription of the utterance or word. If the transcription did not require any correction, the dialog continues. The ASR uses the first incorrectly recognized verbal response along with the second recognized verbal response and either the corrected transcription or unmodified transcription of the second recognized verbal response to automatically retrain one or more speech models.

After the start of a dialog, for example, the IVR dialog asks the speaker to provide a verbal response and a model adaptation agent in the ASR records this spoken input, i.e., utterances or words. In a first stage of normal operation, a speech recognition engine in the ASR receives the verbal response and attempts to recognize the verbal response, i.e., provide a transcript of the spoken utterances or words. The speech recognition engine communicates with a text-to-speech TTS resource and uses the TTS resource to convert the transcript to speech, which is heard by the customer to confirm the speech recognition engine correctly recognized the spoken input.

In the second stage of normal operation, the speech recognition engine determines the speaker does not believe the verbal response was correctly recognized, i.e., an error is detected, such as the speaker confirms that the first attempt at recognition was wrong. A model adaptation agent uses monitoring and intervention, if necessary, to guarantee that the next transcription of the spoken input, i.e., the actual text of the word or utterance, is correct.

Hence in the second stage of operation, the model adaptation agent alerts a human agent, for example an operator. The IVR dialog asks the speaker to repeat his verbal response. The model adaptation agent records this second verbal response and requests the speech recognition engine to provide a transcription of the verbal response. The model adaptation agent sends the recorded verbal response along with a transcription of this second verbal response to the operator's workstation. The operator listens to the recording of the speaker's second verbal response and reviews the transcription of the second verbal response. If the transcription of the verbal response is correct, the operator does not intervene. The transcription is sent to the TTS resource, which converts the transcription to speech. The next dialog message to the speaker asks the speaker to confirm the transcription. If the speaker confirms the transcription, the dialog continues. The model adaptation agent sends the first and second verbal responses along with the unmodified transcription of the second verbal response to the adaptation engine.

If the transcription of the input is incorrect, the human agent intervenes and the transcription of the misrecognized second verbal response is corrected. The corrected transcription is sent to the TTS resource, which converts the transcription to speech. The next dialog message to the speaker asks the speaker to confirm the corrected transcription of the second verbal response that was converted to speech. If the speaker confirms the newly corrected transcription, the dialog continues and the speaker does not hang up in frustration because only one misrecognition occurred. The model adaptation agent sends the first and second verbal responses along with the corrected transcription of the second verbal response to the adaptation engine. Hence, the model adaptation agent ensures only correct data is used to automatically adapt one or more speech models.

DETAILED DESCRIPTION

Figure 1:
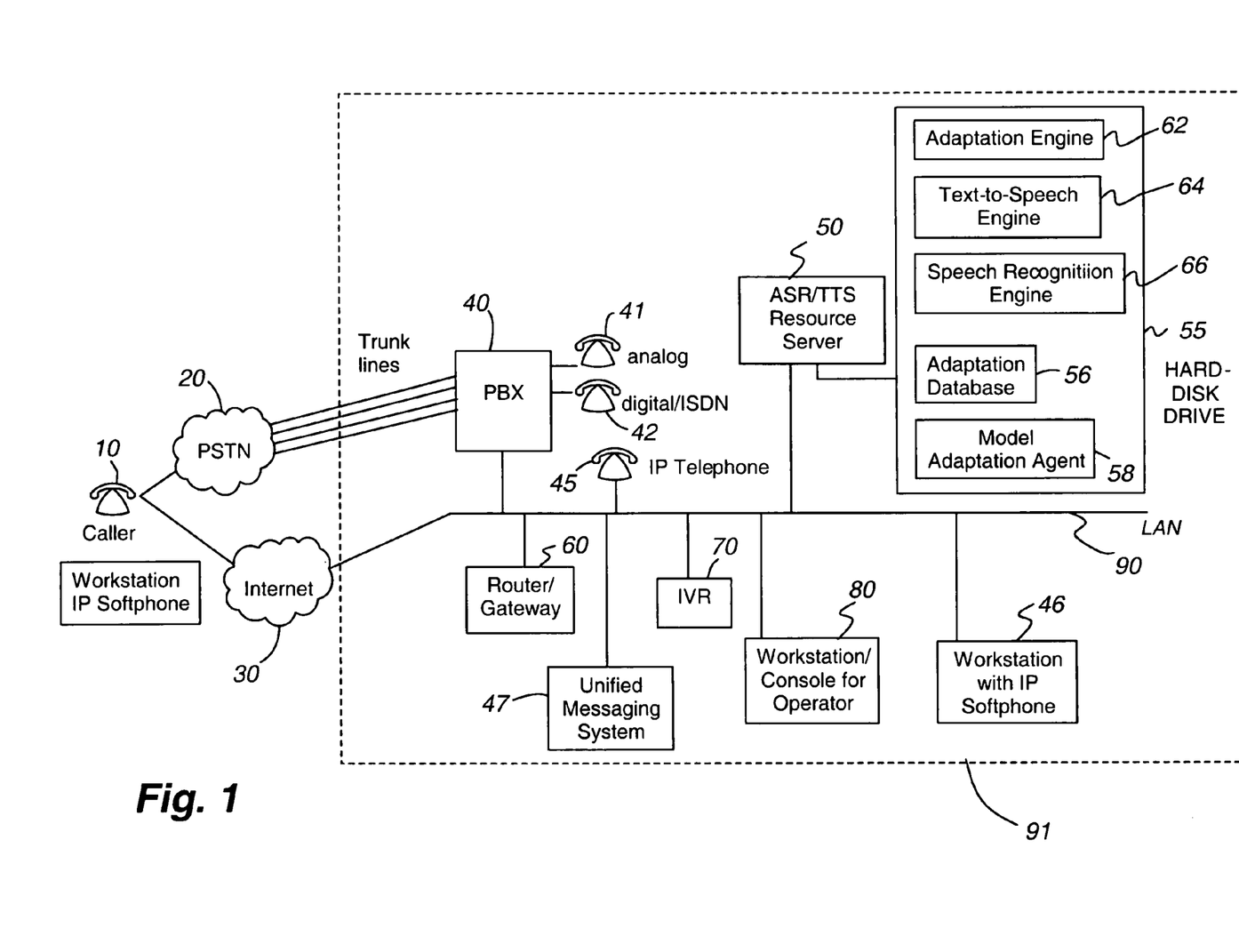
FIG. 1 is a block diagram of a system utilizing the present invention.

FIG. 1 is a block diagram of a system utilizing the automatic speech recognition (ASR) 50 of the present invention. System 91 includes telecommunications equipment found in an enterprise, such as a bank, small or large corporation, university, government facility etc. When customer 10 dials an enterprise but does not know the direct telephone number of the individual he wants to speak to, customer 10 may place a telephone call via the public switched telephone network (PSTN) 20 to the enterprise's main telephone number. Similarly, customer 10 may use IP softphone application on his personal computer 11 to allow his PC to function as a desktop IP phone or use a desktop IP telephone 10 to place a telephone call using the Internet 30. The enterprise most likely will have an interactive voice response (IVR) 70 system present a variety of menu options to the customer 10. If the customer's 10 telephone does not have touch-tone (dual tone multi-frequency "DTMF") capability, the customer may still communicate with the interactive voice response system (IVR) 70 using voice response if the IVR 70 has automatic speech recognition ("ASR") capability. In this case, the customer 10 may chose to select the enterprise's corporate name directory menu and be transferred to the desired individual within the enterprise when the correct name is found. Note rather than use a telephone, the caller may alternatively use a microphone associated with the caller's workstation 11, or an personal digital assistant with telephony capabilities, or any other communication device with telephony capabilities.

System 91 includes IVR 70, automatic speech recognition (ASR)/text-to-speech (TTS) resource server 50 with a hard disk drive 55 storing an adaptation database 56, a speech recognition engine 66, a text-to-speech engine 64, and adaptation engine 62, and a model adaptation agent 58, a PBX 40, a router/gateway 60, telephones 41, 42, 45 and a workstation for a human agent 80. The operator's workstation 80, IVR 70, ASR/TTS server 50 and PBX communicate via LAN 90 to other servers within system 91. System 91 may also include unified messaging system 47 and workstation with IP softphone application 46, which also communicate via LAN 90.

The PBX (otherwise known as telephony server) 40 answers and transfers inbound and outbound telephone calls from the PSTN 20 or Internet 30 for internal users, such as, call center agents (not shown), operator 45, or employees (not shown). Calls are routed through the Internet 30 using the router/gateway 60. The telephony server 40 has analog and digital port boards (not shown) to support legacy analog 41 and digital telephones 42 as well as an IP board (not shown) to support IP desktop telephones 45 or IP softphone application software operating on a workstation 46. The telephony server software includes the APIs and drivers to communicate with other computers such as the management console (not shown), IVR 70, ASR/TTS server 50, etc.

The IVR 70 provides the appropriate dialog, i.e., a set menu of options that create navigation paths from one menu to another depending on the caller's menu choice. IVR 70 includes CPU (not shown), memory (not shown), hard-disk drive (not shown), resource cards, such as to answer or transfer calls (not shown), and LAN card (not shown), such as an Ethernet card. IVR 70 hard-disk drive stores recorded prompts, platform software for the operation, administration and maintenance of the IVR such as backup, speech administration, interface software to communicate with other servers such as the ASR/TTS server and the telephony server 40. When the IVR 40 accesses and provides information from a web page, it uses a VXML (voice extensible markup language) interpreter (not shown). The VXML interpreter provides the functionality for parsing and processing the VXML documents that may be stored on a web server (not shown) or anywhere on the Internet 30.

The ASR/TTS resource server 50 includes the APIs and drivers to communicate with other computers such as the management console (not shown) to administer the ASR/TTS server 50, telephony server 40, IVR 70, router/gateway 60, and an operator's workstation 80, etc. The ASR/TTS resource server 50 also includes the software to provide the text-to-speech (TTS) resource and the automatic speech recognition (ASR) resource. The ASR/TTS resource server 50 communicates with the operator's workstation over the LAN using TCP/IP, for example.

The ASR/TTS server 50 has a CPU (not shown), memory (not shown), LAN card (not shown) and hard-disk drive 55. The hard-disk drive 55 also stores the speech recognition engine 66 (which extracts a user utterance from a sampled input voice stream, selects a speech model as a first tentative recognition result correctly characterizing the user utterance, generates a transcription of the utterance based on the selected speech model, and determines from a user's response, when presented with the first tentative recognition result, whether the first tentative recognition result correctly characterizes the utterance), the text-to-speech engine 64 (which converts the transcription into speech), the adaptation engine 62 (which retrains one or more speech models based on the user utterance and the transcription or a human operator-corrected version thereof), and adaptation database 56 (which includes the various speech models particularly suited for one or more different voice-enabled applications that may reside on the ASR/TTS server 50, such as, on-line banking, technical support, request for a name directory, accessing a desktop calendar or appointment scheduler, information from a web page, etc.). Other voice-enabled applications may include an individual calling from home or anywhere outside of the place of business to retrieve information such as voice, email or fax messages via his unified messaging system 47 and IVR 70. Alternatively when customer 10 or internal user within the enterprise is going to purchase items from a catalog, he may dial the main 800 telephone number for the catalog and wait for the next available agent to assist him with the order or use the voice response ordering system to order the item from the catalog. The adaptation database 56 also stores the vocabulary to support the various speech models. The ASR/TTS server 50 uses APIs and API calls to retrieve or store information within the adaptation database 56.

The ASR/TTS server 50 hard-disk drive 55 stores the ASR application which includes a model adaptation agent 58 as well as the maintenance, administration, and operating software. The ASR operating software allows customers to utilize voice-enabled applications such as those listed above. The speaker may either dial the IVR 70, dial the ASR/TTS server 50 directly, if configured in that manner, or speak directly to an voice input mechanism, such as a microphone, associated with an object utilizing an ASR/TTS application.

The ASR operating software also includes the model adaptation agent 58. The model adaptation agent 58 uses a human agent, such as an operator, to guarantee that only good data, i.e., incorrectly recognized data is filtered, is provided to the adaptation engine to improve one or more speech models.

When the IVR 70 dialog requests and the customer provides voice input, the IVR interfaces with the ASR/TTS application to provide the voice response, i.e., audio stream to the ASR/TTS application. The model adaptation agent 58 has the drivers necessary to record and save the audio stream. This audio recording may be stored temporarily in the ASR/TTS memory (not shown) or stored on the ASR/TTS hard disk drive 55.

A management console (not shown) administers the telephony server 40, ASR/TTS resource server 50, IVR 70 and the router/gateway 60 and allows the administrator to retrieve reports regarding performance, system usage, etc. The management console (not shown) may use a command-line or graphical user interface to administer the various servers. Alternatively, the management console may have interface software and utilities, which allows an administrator to use an Internet browser to administer the various servers. In this case, the servers administered via the Internet browser also need to have the proper interface software to allow administration via an Internet browser.

In an alternate embodiment, the IVR 70 and ASR/TTS server 50 may be co-resident, i.e., configured on one server, and the telephony server 40 communicates directly with this co-resident IVR/ASR/TTS server. Operating these co-resident applications depends on the system performance requirements for the server and applications. For small enterprises with minimal ASR requests and hence require less processing resources, operating these co-resident applications on a server may not affect the system performance of the applications or of the server. For large enterprises with presumably many more ASR requests, there may be a need to have the IVR and ASR/TTS applications operating on separate servers to maintain server performance levels.

Figure 2:
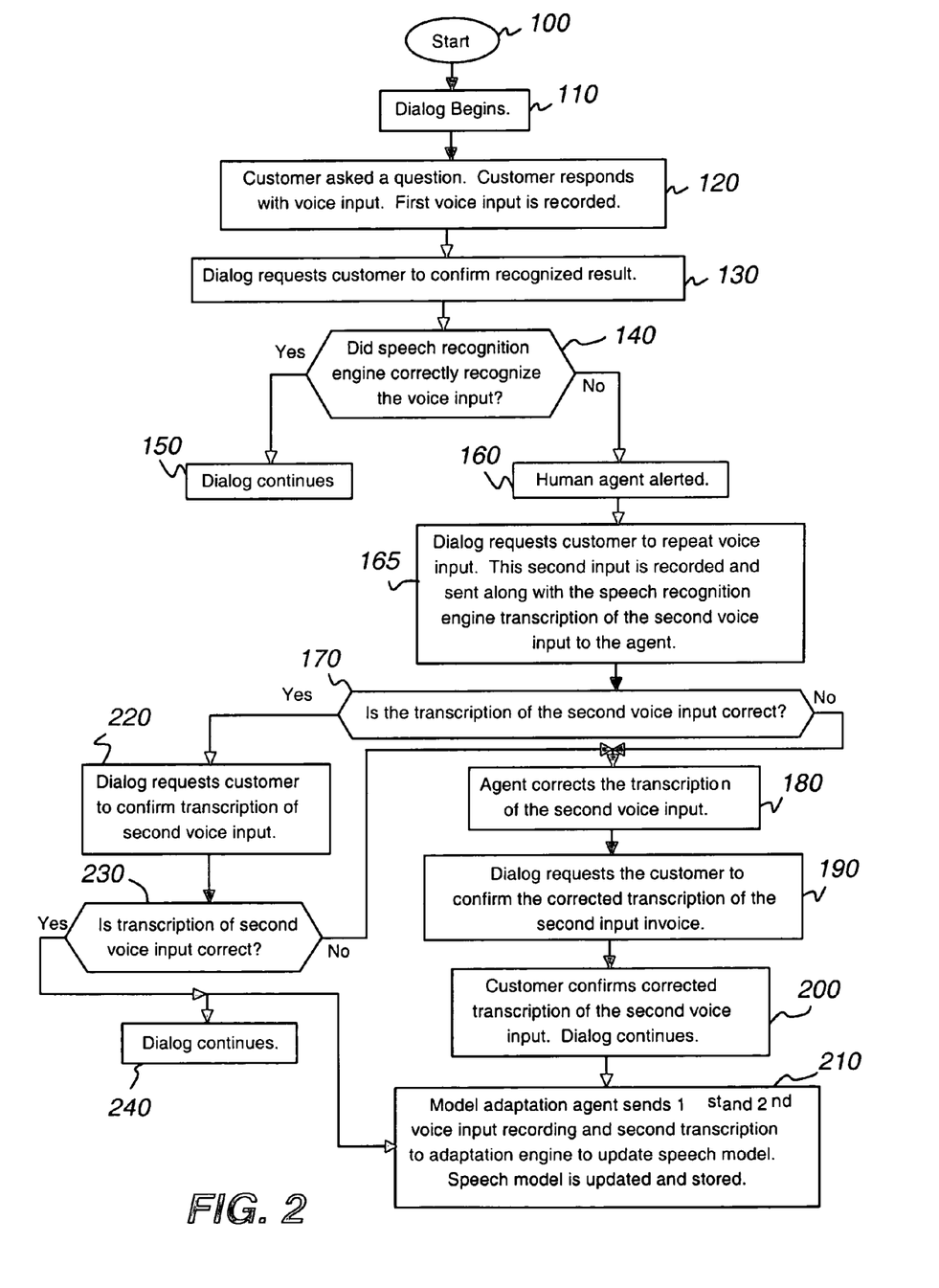
FIG. 2 is a flow diagram of the present invention.

FIG. 2 is a flow diagram of one embodiment of the present invention. In step 100, a customer dials the access telephone number for a business. In normal operations, the telephony server 40 answers a call and transfers the call to the IVR 70. If the customer uses speech recognition instead of DTMF to respond to the IVR dialog prompts, the IVR 70 uses API calls to communicate with the ASR application on the ASR/TTS server 50.

In step 110, the IVR 70 application initiates the appropriate voice-enabled dialog script particularly suited for the application requested, i.e., dialed by the customer. For example, the dialog script to retrieve names from a name directory would differ from the dialog script to transfer funds between bank accounts.

After the start of an IVR 70 dialog, the IVR 70 dialog prompt asks the customer, i.e., speaker to provide a verbal response. (FIG. 2, step 120). The ASR application instructs an ASR engine residing on the ASR/TTS server 50 to receive the verbal response, i.e., audio stream from the IVR 70. The ASR engine recognizes the audio stream as speech and the model adaptation agent 58 records the audio stream. (FIG. 2, step 120). This first recording is temporarily stored in the ASR/TTS server 50 in a storage device, such as memory (not shown) or hard-disk drive 55.

In a first stage of normal operation, the ASR engine receives the audio stream, i.e., voice response, and attempts to recognize the response, i.e., provide a transcription of the audio stream. The ASR engine provides the transcript to a text-to-speech TTS resource and uses the TTS resource to convert the transcript to speech, i.e., audio. The ASR application includes the API and drivers to communicate and send the audio back to the telephony server 40 voice channel established between the customer and IVR for presentation to the customer or user to confirm the ASR correctly recognized the spoken input. (FIG. 2, step 130). Alternatively, the ASR application returns the speech to the software originating the ASR resource request.

In a second stage of normal operation, the ASR engine determines whether it correctly recognized the voice input, i.e., provided the customer a correct transcription of the audio stream. (FIG. 2, step 140). The ASR engine may determine the speaker does not believe the audio was correctly recognized, i.e., an error is detected, based on the speaker's behavior. An error is detected, for example when a speaker verbally confirms the first attempt at recognition was wrong by saying "No" as a response to the confirmation request. There are other methods to determine the ASR engine did not correctly recognize the audio stream. For example, the speaker's voice level may get louder and more irate or the customer may begin pressing a key on the touch-tone telephone to allow the customer to make another voice input, etc.

The model adaptation agent 58 interfaces with the ASR engine to monitor and if necessary intervene to guarantee that the next transcription of the verbal response, i.e., the actual spelling of the word or utterance, is correct. Monitoring occurs when the ASR engine determines it may not have correctly recognized the customer's first voice response. Hence in step 160, the model adaptation agent 58 alerts a human agent, for example an operator, by either sending a pop-up message to the operators console (not shown) notifying the operator that an audio stream and transcription is forthcoming, by sending a special tone to the operator's headset or using a special ring tone to notify the operator of the incoming information. In step 165, the model adaptation agent 58 communicates with the IVR 70 using API calls and instructs the IVR 70 dialog to request the speaker to repeat his verbal response. The model adaptation agent 58 records this second verbal response, i.e., audio stream, and provides the audio stream to the ASR engine. The model adaptation agent 58 provides the recorded audio stream of the second verbal response and a transcription of the audio stream from the ASR engine to the operator's workstation/console 80.

The operator workstation/console 80 allows the operator to view the transcription of the recognized utterance or word. The operator also hears the recording of the audio, i.e., the spoken utterance or word using a headset (not shown) or via the telephone 41, 42, 45, 46 to determine whether the transcription is correct. The model adaptation agent 58 provides possible matches to the operator from the vocabulary stored in the adaptation database 56. If the transcription is not correct and there are several possible matches, the operator toggles through the choices and selects the best choice or alternatively the operator edits the transcription if none of the choices are a match. The interface to the console/workstation 80 may use a command line or graphical user interface (GUI) to view and correct the transcription. Alternatively, the interface to the console/workstation may allow the use of an Internet browser to view the ASR transcription and correct the transcription if necessary.

In step 170, the operator listens to the recording of the speaker's second verbal response and reviews the transcription of the verbal response to determine whether the transcription of the second verbal response is correct. If the transcription of the response is correct, the operator will not modify the transcription, i.e., the operator does not intervene. The transcription is sent to the TTS resource, which converts the transcription to speech. In step 220, the next dialog message asks the speaker to confirm the unmodified transcription converted to speech, such as "Was that X?" If the speaker confirms the unmodified transcription (step 230), the dialog continues (step 240) without on-line intervention by the operator. The model adaptation agent 58 instructs an adaptation engine on the ASR/TTS server 50 to use the first and second recording of the speaker's verbal response along with the unmodified transcription of the second recording to update one or more speech models (210). Retraining the speech model with this information will allow the ASR engine to correctly recognize the utterance or word in the future. The newly adapted speech model is stored in the ASR/TTS server 50 hard-disk drive 55 adaptation database 56.

However in step 220, the speaker may not confirm the unmodified transcription of the second verbal response, i.e., word or utterance is correct. (FIG. 2, step 230). In this case, the model adaptation agent 58 presents the transcription of the second verbal response and the voice recording of the $2^{nd}$ verbal response to the operator for reevaluation and correction (step 180). The operator corrects the transcription of the second verbal response. This may be simply correcting the text of the word or utterance. Alternatively, correcting the transcription may be more involved and include correcting the phoneme of the word or utterance, for example, depending on the sophistication of the editing tool on the operator's workstation 80. The operator temporarily stores the corrected transcription in the ASR/TTS server 50 hard-disk drive 55 or alternatively in any other storage means, such as memory (not shown) or flash card (not shown).

In step 190, the model adaptation agent 58 instructs the next IVR dialog message to ask the speaker to confirm the corrected transcription. If the speaker confirms the transcription is correct, the dialog continues. (FIG. 2, step 200). The model adaptation agent 58 sends the $1^{st}$ and $2^{nd}$ recorded verbal responses and corrected transcription of the second verbal response to the adaptation engine. The model adaptation agent 58 instructs the adaptation engine to retrain one or more speech models with this filtered information. The one or more updated speech models are stored in the ASR/TTS server 50 hard-disk drive 55 adaptation database 56.

In step 170, if the transcription of the verbal response is incorrect the operator intervenes and the transcription of the misrecognized word or utterance is corrected (step 180). The operator temporarily stores the corrected transcription in the ASR/TTS server 50 hard-disk drive 55 or memory (not shown). The corrected transcription is sent to the TTS resource, which converts the transcription to speech. In step 190, the model adaptation agent 58 instructs the next IVR dialog message to asks the speaker to confirm the corrected transcription that was converted to speech. If the speaker confirms the newly corrected transcription, the dialog continues (step 200) and the speaker does not hang up in frustration because only one misrecognition occurred. In step 210, the model adaptation agent sends the first and second recording of the misrecognized verbal response, i.e., word or utterance, along with the corrected transcription to the adaptation engine. The model adaptation agent 58 instructs an adaptation engine to use the first and second recorded verbal response along with corrected transcription to update one or more speech models. Retraining one or more speech models with this information will allow the ASR engine to correctly recognize the utterance or word in the future. The updated speech model is stored in the ASR/TTS server 50 hard-disk drive 55 adaptation database 56.

Hence, using the example provided in the background of the invention where several misrecognitions occurred, the invention rapidly improves one or more speech models and the performance of the speech recognition system as shown:

IVR dialog: "Please state the name of the company you wish to find."

Customer: "Avaya."

(This first voice response is recorded by the model adaptation agent 58 and temporarily stored on the ASR/TTS server. FIG. 2, step 120.)

IVR dialog: "Was that Papaya Limited?"

(This is what the ASR engine recognized as the customer's voice response. FIG. 2, step 130.)

Customer: "No."

(ASR application alerts an operator to monitor the call. FIG. 2, step 140, 160. The ASR application requests the IVR dialog to repeat the question, which requires the customer to repeat the verbal response. FIG. 2, step 165.)

IVR dialog: "Please state the name of the company you wish to find."

Customer: "Avaya."

(The model adaptation agent 58 records the second verbal response and temporarily stores the recording on the ASR/TTS server 50. The model adaptation agent 58 sends the recorded audio stream to the operator workstation 80. The agent hears the recorded audio stream and sees on the console the ASR engine's transcription of the audio stream. The agent sees the ASR engine has misrecognized the second verbal response as "Avalon Labs" and corrects the transcription to "Avaya." FIG. 2, step 170, 180. The operator stores the corrected transcription on the ASR/TTS server 50. The model adaptation agent 58 sends the corrected transcription to the TTS resource. The TTS resource converts the corrected transcription to speech and sends the speech to the IVR.)

IVR dialog: "Was that Avaya?"

(The model adaptation agent 58 instructs the dialog to request the customer to confirm the corrected transcription. FIG. 2, step 190.)

Customer: "Yes."

(Customer confirms corrected transcription. Now the dialog proceeds as usual. FIG. 2, step 200. The model adaptation agent 58 sends the first and second recorded voice response along with the corrected transcription to update one or more speech models. (FIG. 2, step 210.) In the future, the speech recognizer should recognize the word "Avaya.")

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternative, interchangeable and/or equivalent structures, functions, ranges or steps to those claimed, whether or not such alternative, interchangeable and/or equivalent structures, functions, ranges or steps are disclosed herein, and without intending to publicly dedicate any patentable subject matter.

What is claimed is:

1. A method to retrain an automatic speech recognition system, in which automatic speech recognition system a plurality of speech models is stored, the method comprising:
   (a) extracting, by the automatic speech recognition system, a first user utterance from a sampled first input voice stream received from a user in response to a query;
   (b) selecting, by the automatic speech recognition system and based on the first user utterance, a first speech model from among the plurality of speech models, the first speech model producing a first tentative recognition result corresponding to the first user utterance;
   (c) informing the user of the first tentative recognition result;
   (d) determining, by the automatic speech recognition system, from the user's response whether the first tentative recognition result was correct;
   (e) performing the following steps when the first tentative recognition result is not correct:
      (i) requesting the user to repeat the response to the query;
      (ii) extracting, by the automatic speech recognition system, a second user utterance from a sampled second input voice stream received from the user in response to the requesting step;
      (iii) selecting, by the automatic speech recognition system and based on the second user utterance, a second speech model, different than the first speech model, the second speech model producing a second tentative recognition result corresponding to the second user utterance; and
      (iv) determining, by a human operator, when the second speech model correctly corresponds to at least one of the first and second user utterances,
   wherein the first and second speech models are selected from a plurality of speech models.

2. The method of claim 1, wherein the plurality of speech models are developed from a large vocabulary stored in a speech recognition adaptation database; and wherein step (e) further comprises:
   (v) retraining the first speech model using the second speech model.

3. The method of claim 1, wherein the first tentative recognition result is at least one word.

4. The method of claim 1, wherein, when the first tentative recognition result is correct, steps (i)-(v) are not performed.

5. The method of claim 1, wherein the automatic speech recognition system provides a transcription of at least one of the first and second user utterances and wherein the informing step comprises:
- converting, by a text-to-speech resource, the transcription into speech; and
- communicating, by an interactive voice response unit, the speech to the user.

6. The method of claim 5, wherein the determining, by a human operator, step comprises:
- displaying the transcription to the human operator;
- playing a recording of the at least one of the first and second user utterances to the human operator; and
- selecting, by the human operator, a third speech model as correctly corresponding to the recording, based on the transcription and recording.

7. The method of claim 1, further comprising:
- selecting, by the human operator, a third speech model that correctly corresponds to the second user utterance, when the second speech model does not correctly correspond to the second user utterance.

8. The method of claim 7, further comprising:
- retraining at least one speech model using said third speech model.

9. A computer readable medium comprising processor executable instructions that, when executed, perform the steps of claim 1.

10. A method to retrain an automatic speech recognition system, in which automatic speech recognition system a plurality of speech models is stored, the method comprising:
- (a) extracting, by the automatic speech recognition system, a first user utterance from a first input voice stream from a user, the first user utterance being a response to a query;
- (b) selecting, by the automatic speech recognition system, a first speech model, the first speech model producing a first tentative recognition result based on the first user utterance;
- (c) determining, by the automatic speech recognition system, that the first tentative recognition result does not correctly characterize the first user utterance;
- (d) selecting, by a human operator and based on at least one of the first user utterance and a second user utterance received from the user, a second speech model as correctly characterizing the first user utterance, the second speech model producing a second tentative recognition result; and
- (e) retraining the first speech model using at least one of the first and second user utterances and the second tentative recognition result.

11. The method of claim 10, wherein, when the first tentative recognition result correctly characterizes the first user utterance, not performing the selecting step (d).

12. The method of claim 10, wherein the plurality of speech models are developed from a large vocabulary stored in a speech recognition adaptation database and wherein the determining step comprises:
- (C1) informing the user of the first tentative recognition result; and
- (C2) determining from the first user's response whether the first tentative recognition result correctly characterizes the first user utterance.

13. The method of claim 12, further comprising before the human operator selecting step (d):
- (f) requesting the first user to repeat the response to the query;
- (g) extracting the second user utterance from a sampled second input voice stream received from the first user in response to the requesting step (e); and
- (h) selecting the second speech model producing the second tentative recognition result corresponding to the second user utterance.

14. The method of claim 10, wherein the automatic speech recognition system generates a transcription of the first user utterance and wherein the determining step (c) comprises:
- (C1) converting, by a text-to-speech resource, the transcription into speech; and
- (C2) communicating, by an interactive voice response unit, the speech to the user.

15. The method of claim 14, wherein the selecting step (d) comprises:
- (D1) displaying the transcription to the human operator;
- (D2) playing a recording of the first user utterance to the human operator; and
- (D3) selecting, by the human operator and based on the transcription and recording, a third speech model as correctly corresponding to the recording.

16. The method of claim 14, wherein an adaptation agent is operable to provide an adaptation engine improved data to retrain at least one speech model, the improved data comprising said first user utterance and at least one of (i) a corrected transcription of said first user utterance when said human operator corrects said transcription; (ii) an unmodified transcription of said first user utterance when said human operator does not correct said transcription.

17. A computer readable medium comprising instructions that, when executed, perform the steps of claim 10.

18. The method of claim 10, wherein the first tentative recognition result is at least one word.

19. A speech recognition system comprising:
- a speech recognition resource operable to extract a first user utterance from a first input voice stream from a user, the first user utterance being a response to a query; select a first speech model producing a first tentative recognition result characterizing the first user utterance; and determine that the first tentative recognition result does not correctly characterize the first user utterance;
- a model adaptation agent operable, when the first tentative recognition result does not correctly characterize the first user utterance, to alert a human operator, based on the first user utterance, to select a second speech model, different than the first speech model, to produce a second tentative recognition result correctly characterizing the first user utterance,
- wherein the first and second speech models are selected from a plurality of speech models.

20. The system of claim 19, further comprising:
- an interactive voice response unit operable to inform the user of the first tentative recognition result and wherein the speech recognition resource is operable to determine from the first user's response whether the first tentative recognition result correctly characterizes the first user utterance; and further comprising:
- an adaptation engine operable to retrain at least one speech model using at least the second tentative recognition result.

21. The system of claim 19, further comprising:
- an interactive voice response unit operable to request the first user to repeat the response to the query; and wherein the automatic speech recognition system is operable to extract a second user utterance from a sampled second input voice stream received from the first user in response to the request and select a third speech model to produce a third tentative recognition result corresponding to the second user utterance.

22. The system of claim 19 wherein, when the first tentative recognition result correctly characterizes the first user utterance, the adaptation engine does not alert the human operator.

23. The system of claim 19, wherein the speech recognition resource generates a transcription of at the first user utterance and further comprising:

a text-to-speech resource operable to convert the transcription into speech; and an interactive voice response unit operable to communicate the speech to the user.

24. The system of claim 23, wherein the adaptation agent is operable to display the transcription to the human operator and play a recording of the first user utterance to the human operator and wherein the human operator, based on the transcription and recording, selects a third speech model as correctly corresponding to the recording.

* * * * *